United States Patent
Shiraiwa

(10) Patent No.: US 7,854,657 B2
(45) Date of Patent: Dec. 21, 2010

(54) COMMUNICATION GAME PROGRAM AND COMMUNICATION GAME SYSTEM

(75) Inventor: Yusuke Shiraiwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 751 days.

(21) Appl. No.: 11/495,596

(22) Filed: Jul. 31, 2006

(65) Prior Publication Data

US 2007/0078005 A1 Apr. 5, 2007

(30) Foreign Application Priority Data

Oct. 4, 2005 (JP) .............................. 2005-291640

(51) Int. Cl.
*A63F 9/24* (2006.01)
*A63F 13/00* (2006.01)

(52) U.S. Cl. .............................. 463/42; 463/25; 463/29; 463/40; 463/41

(58) Field of Classification Search .................. 463/40, 463/41, 42, 25, 29; 709/205, 227
See application file for complete search history.

(56) References Cited

U.S. PATENT DOCUMENTS

| | | | | | |
|---|---|---|---|---|---|
| 5,007,649 | A | * | 4/1991 | Richardson | 463/25 |
| 5,695,400 | A | * | 12/1997 | Fennell et al. | 463/42 |
| 5,775,996 | A | * | 7/1998 | Othmer et al. | 463/40 |
| 5,820,463 | A | * | 10/1998 | O'Callaghan | 463/42 |
| 5,850,447 | A | * | 12/1998 | Peyret | 463/29 |
| 6,012,096 | A | * | 1/2000 | Link et al. | 709/233 |
| 6,042,477 | A | * | 3/2000 | Addink | 463/42 |
| 6,415,317 | B1 | * | 7/2002 | Yelon et al. | 709/205 |
| 6,475,090 | B2 | * | 11/2002 | Roelofs | 463/42 |
| 6,819,669 | B2 | * | 11/2004 | Rooney | 370/390 |
| 6,874,029 | B2 | * | 3/2005 | Hutcheson et al. | 709/227 |
| 7,125,336 | B2 | * | 10/2006 | Anttila et al. | 463/40 |

(Continued)

FOREIGN PATENT DOCUMENTS

JP 7-213744 8/1995

(Continued)

OTHER PUBLICATIONS

Bernier, "Lag Compensation" from Valve Developer Community, http://developer.valvesoftware.com/wiki/Lag_ Compensation, 11 pages, Apr. 2001.

(Continued)

*Primary Examiner*—John M Hotaling, II
*Assistant Examiner*—Ryan Hsu
(74) *Attorney, Agent, or Firm*—Nixon & Vanderhye P.C.

(57) ABSTRACT

A game device measures a delay time between the game device and each of other game devices, all of which communicate with each other, and stores start time data in a memory. Furthermore, the game device calculates a time at which each of the other game devices starts executing a predetermined event based on the delay time, so as to be transmitted to each of the other game devices. When data indicating a time at which the game device starts executing the predetermined event (correction data) is transmitted from each of the game devices, the game device corrects a time indicated by the start time data based on the transmitted data. Thereafter, the game device executes the predetermined event (a racing game) at the time indicated by the start time data.

9 Claims, 9 Drawing Sheets

U.S. PATENT DOCUMENTS

| | | | |
|---|---|---|---|
| 7,230,974 B1 * | 6/2007 | Lu et al. | 375/145 |
| 7,244,181 B2 * | 7/2007 | Wang et al. | 463/42 |
| 2001/0038178 A1 * | 11/2001 | Vancura | 273/274 |
| 2002/0042293 A1 * | 4/2002 | Ubale et al. | 463/9 |
| 2002/0142843 A1 | 10/2002 | Roelofs | |
| 2002/0194269 A1 | 12/2002 | Owada et al. | |
| 2003/0204565 A1 | 10/2003 | Guo et al. | |

FOREIGN PATENT DOCUMENTS

| | | |
|---|---|---|
| JP | 2001-198363 | 7/2001 |
| JP | 2003-6127 | 1/2003 |

OTHER PUBLICATIONS

Bernier, "Source Multiplayer Networking" from Valve Developer Community, http://developer.valvesoftware.com/wiki/Source_Multiplayer Networking 5 pages, Nov. 2004.

European Office Action mailed Sep. 21, 2009 in corresponding European Application No. 06 016 339.1.

Nichols et al., "The Effects of Latency on Online Madden NFL® Football," International Workshop on Network and Operating System Support for Digital Audio and Video, Proceedings of the 14th International Workshop on Network and Operating Systems Support for Digital Audio and Video, 2004, pp. 1-8.

* cited by examiner

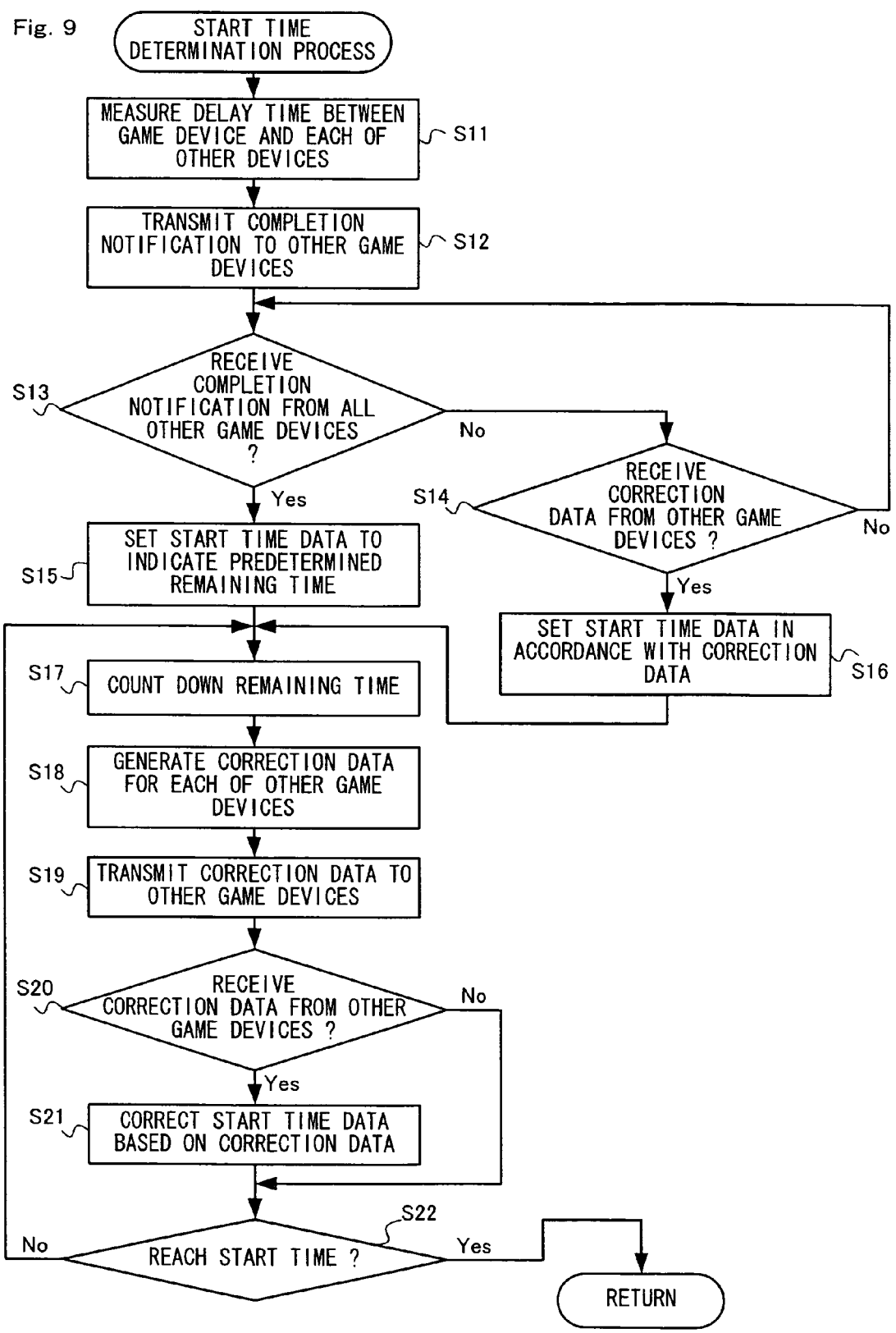

COMMUNICATION GAME PROGRAM AND COMMUNICATION GAME SYSTEM

CROSS REFERENCE TO RELATED APPLICATION

The disclosure of Japanese Patent Application No. 2005-291640 is incorporated herein by reference.

BACKGROUND

1. Field of the Technology

The technology presented herein relates to a communication game program and communication game system for executing a game to be executed by a plurality of game devices. More particularly, the present technology relates to a communication game program and communication game system for allowing times at which a plurality of game devices start certain events executed during the games to coincide with each other.

2. Description of the Background Art

Conventionally, a game system in which a plurality of players operate a same game to be executed by a plurality of game devices connecting with each other through a network is widely known. Particularly, in recent years, a network role playing game (hereinafter, referred to as a network RPG) has become popular. In the network RPG, a plurality of players can operate a same game connected through a server, or through a peer to peer network.

In the network RPG, there is no problem as long as all the game devices arrive at the same end result of the game even if progression states of the games to be executed by the game devices (i.e., images displayed on screens of the game devices at a given time during the game) slightly differs from each other. That is, there is no major problem in the network RPG, even if times required for the game devices to transmit or receive data differs from each other due to increase and decrease in network traffic, noise on the network (in a case where the network is connected through a wireless path), etc.

On the other hand, in a game such as a racing game or an action game, a player needs to operate the game more swiftly with an accurate timing. Therefore, in such a game, if contents of data used for game processes to be executed by a plurality of players and times at which the plurality of game devices receive the data differ from each other, the game processes to be executed by the plurality of players accordingly differ from each other, thereby spoiling the game. Thus, when a communication system communicating over the network executes a game such as the racing game or the action game, the progression states of the games to be executed by the game devices need to coincide with each other, if necessary. In the racing game, for example, times at which the game devices start the racing games need to coincide with each other.

Patent document 1 (Japanese Laid-Open Patent Publication No. 2001-198363) discloses a system comprised of a plurality of game devices including a master device and slave devices. In the system, each of the slave devices measures a delay time between the master device and the slave device, and the master device collects measurement results from each of the slave devices. Taking the collected delay times into consideration, the master device determines a time remaining before each of the slave devices resets its timer, and transmits the time to each of the slave devices. Because the time is calculated based on the delay time between the master device and each of the slave devices, a time remaining before a slave device resets its timer differs from that remaining before another slave device resets its timer. In the aforementioned system, a delay time between the master device and each of the slave devices is measured, and a time remaining before each slave device resets its timer is determined based on the measured delay time, thereby allowing the times at which the game devices reset the timers to coincide with each other. Thus, the times at which the game devices start the games can coincide with each other.

In the system disclosed in patent document 1, the master device determines, based on the delay time between the master device and each of the slave devices, a time remaining before the slave device resets its timer. That is, a process of synchronizing the master device with each of the slave devices is executed in the system. However, a process of synchronizing a slave device with each of other slave devices is not executed in the system. Therefore, in a case where there is a difference between times counted by the timers of the slave devices, it is difficult to correct the difference. Therefore, in the aforementioned system, there is a problem in that it is difficult to accurately synchronize a slave device with each of other slave devices, whereby all the game devices may not be synchronized with each other.

SUMMARY

Therefore, a feature of an example embodiment presented herein is to provide a communication game program and a communication game system, both capable of allowing contents of game processes to be executed by a plurality of game devices, comprised of the communication game system communicating over a network having a communication delay, to coincide with each other as much as possible.

The example embodiment has the following features to attain the above. Note that reference numerals and figure numbers are shown in parentheses below for assisting the reader in finding corresponding components in the figures to facilitate the understanding, but they are in no way intended to restrict the scope of the example embodiment.

A first aspect is directed to a storage medium storing a communication game program (51) to be executed by a computer (a CPU core 21, etc.) of a game device (10) included in a communication game system comprised of the game device (10a) and at least one other game device (10b, 10c) being connected to each other through a network (1). The communication game program instructs the computer to perform a measurement step (S11), a storage step (S15, S16), a transmission step (S19), a correction step (S21), and an event execution step (S3). The measurement step measures a delay time between the game device and each of the at least one other game device, all of which communicate with each other. The storage step stores start time data (64) indicating a time (i.e., a time point) at which the game device starts executing a predetermined event in a memory (a RAM 24). The transmission step calculates a time at which each of the at least one other game device starts executing the predetermined event based on the delay time, and transmitting data indicating the time (transmitted correction data 65) to each of the at least one other game device. The correction step corrects, when data indicating a time at which the game device starts executing the predetermined event (correction data) is transmitted from each of the other devices, the time indicated by the start time data based on the transmitted data. The event execution step executes the predetermined event (a racing game) at the time indicated by the start time data.

In a second aspect, the start time data may indicate a remaining time from a current time to the time at which the game device starts executing the predetermined event. In this case, the storage step is executed after each of the at least one other game device included in the communication game system finishes measuring the delay time. Furthermore, the communication game program instructs the computer to further perform a subtraction step (S17) of repeatedly executing a process of updating the start time data at a predetermined time interval such that the updated start time data indicates a time obtained by subtracting a predetermined time from the start time data.

In a third aspect, the communication game program may instruct the computer to further perform a completion notification step (S12) of notifying each of the at least one other game device that the game device finishes measuring the delay time. In this case, the subtraction step is executed if the game device has received a notification indicating that each of the at least one other game device finishes measuring the delay time or if data indicating the time at which the game device starts executing the predetermined event is initially transmitted from the at least one other game device.

In a fourth aspect, in the storage step, when the game device has received the notification indicating that each of the at least one other game device finishes measuring the delay time, data indicating a predetermined time is stored in the memory as the start time data, and when the data indicating that the time at which the game device starts executing the predetermined event is initially transmitted from the at least one other game device, the data is stored in the memory as the start time data.

In a fifth aspect, the transmission step may be executed at a predetermined time after each of the at least one other game device included in the communication game system finishes measuring the delay time.

In a sixth aspect, the transmission step may be repeatedly executed at a predetermined time interval after each of the at least one other game device included in the communication game system finishes measuring the delay time.

In a seventh aspect, in the transmission step, the time at which each of the at least one other game device starts executing the predetermined event may be calculated based on the delay time between the game device and each of the at least one other game device and the start time data.

In an eighth aspect, in the correction step, a corrected time may be calculated such that the corrected time indicates a time point between the time indicated by the data transmitted from each of the at least one other game device and the time indicated by the start time data.

A ninth aspect is directed to a communication game system comprised of a game device (10a) and at least one other game device (10b, 10c) being connected to each other through a network (1). The game device (10) comprises: measurement means (a CPU core 21, a delay time measurement program 52), storage control means (the CPU core 21, a start time setting program 54), transmission means (the CPU core 21, a correction data transmitting program 56), correction means (the CPU core 21, a correction program 57), and event execution means (the CPU core 21, a racing game program 58). The measurement means measures a delay time between the game device and each of the at least one other game device, all of which communicate with each other. The storage control means stores start time data indicating a time at which the game device starts executing a predetermined event in a memory (the RAM 24) of the game device. The transmission means calculates a time at which each of the other devices starts executing the predetermined event based on the delay time, and transmits data indicating the time to each of the at least one other game device. The correction means corrects, when data indicating a time at which the game device starts executing the predetermined event is transmitted from each of the at least one other game device, the time indicated by the start time data based on the transmitted data. The event execution means executes the predetermined event at the time indicated by the start time data.

According to the first aspect, the game device and the at least one other game device (hereinafter, referred to as "all the game devices") included in the game system respectively executes the communication game program according to the first aspect, thereby making it possible to correct and adjust the time at which the predetermined event is executed among all the game devices being connected to each other through the network having the communication delay. That is, in the transmission step, the data indicating the time at which each of the at least one other game device starts executing the predetermined event is transmitted, and in the correction step, the time indicated by the start time data is corrected based on the transmitted data. Thus, values indicated by the start time data of all the game devices are being converged so as to gradually coincide with each other, thereby making it possible to allow the times at which all the game devises start executing the predetermined events to accurately coincide with other. In other words, it becomes possible to allow the contents of the game processes to be executed by all the game devices included in the game system to coincide with each other as much as possible.

According to the second aspect, the game device starts counting down the remaining time after each of the at least one other game device finishes measuring the delay time. Note that in the second aspect, a game device can transmit the data transmitted by the transmission step (the correction data) to at least one other game device only after the game device finishes measuring the delay time between the game device and each of the at least one other game device. Thus, if a game device starts counting down the remaining time before another game device finishes measuring the delay time, the said another game device cannot transmit the correction data. Therefore, the correction data is transmitted only from the game device which has started counting down. As a result, the times at which all the game devices execute the events may not accurately coincide with each other. However, in the second aspect, the game device starts counting down the remaining time only after each of the at least one other game device can transmit the correction data. Thus, the correction data can be assuredly transmitted to each other among all the game devices, thereby making it possible to allow the times at which the games devices start executing the events to more accurately coincide with each other.

According to the third aspect, the subtraction step is executed after the game device has received the notification indicating that each of the at least one other game device finishes measuring the delay time or after data indicating the time at which the game device starts executing the predetermined event is initially transmitted from the at least one other game device. Therefore, the game device starts counting down the remaining time only after each of the at least one other game device finishes measuring the delay time. Thus, the correction data can be assuredly transmitted to each other among all the game devices, thereby making it possible to allow the times at which all the game devices start executing the events to more accurately coincide with each other.

According to the fourth aspect, the game device can more accurately set a remaining time value which is obtained when the game device starts counting down the remaining time.

According to the fifth aspect, the game device transmits the correction data to the at least one other game device at the predetermined time interval. Therefore, the transmission data can be assuredly transmitted to the at least one other game device, thereby making it possible to allow the times at which all the game devices start executing the events more accurately to coincide with each other. For example, it is assumed that a game device can transmit the correction data only after the game device receives the correction data transmitted from at least one other game device. In this case, the game device cannot transmit the correction data to the at least one other game device until the game device receives the correction data transmitted from the at least one other game device. However, in the fifth aspect, the game device can assuredly transmit the correction data to the at least one other game device.

According to the sixth aspect, the game device transmits the correction data at the predetermined time interval, thereby making it possible to assuredly transmit the correction data to the at least one other game device. As a result, it becomes possible to allow the times at which all the game devices start executing the events to more accurately coincide with each other.

According to the seventh aspect, the time at which each of the at least one other game device starts executing the predetermined event is calculated based on the delay time between the game device and each of the at least one other game device and the start time data. Therefore, the time at which each of the at least one other game device starts executing the predetermined event can be more accurately estimated.

According to the eighth aspect, the corrected time is calculated so as to indicate a time value between the time indicated by the data transmitted from the at least one other game device and the time indicated by the start time data. Therefore, the corrected time can be more accurately corrected, thereby making it possible to allow the times at which all the game devices start executing the events to more accurately coincide with each other.

These and other features, aspects and advantages of the example embodiment presented herein will become more apparent from the following detailed description of the example embodiment when taken in conjunction with the accompanying drawings.

BRIEF DESCRIPTION OF THE DRAWINGS

FIG. 9 is a flowchart illustrating a detailed process flow to be executed in step S2 shown in FIG. 8.

DESCRIPTION OF EXAMPLE EMBODIMENTS

Figure 1:
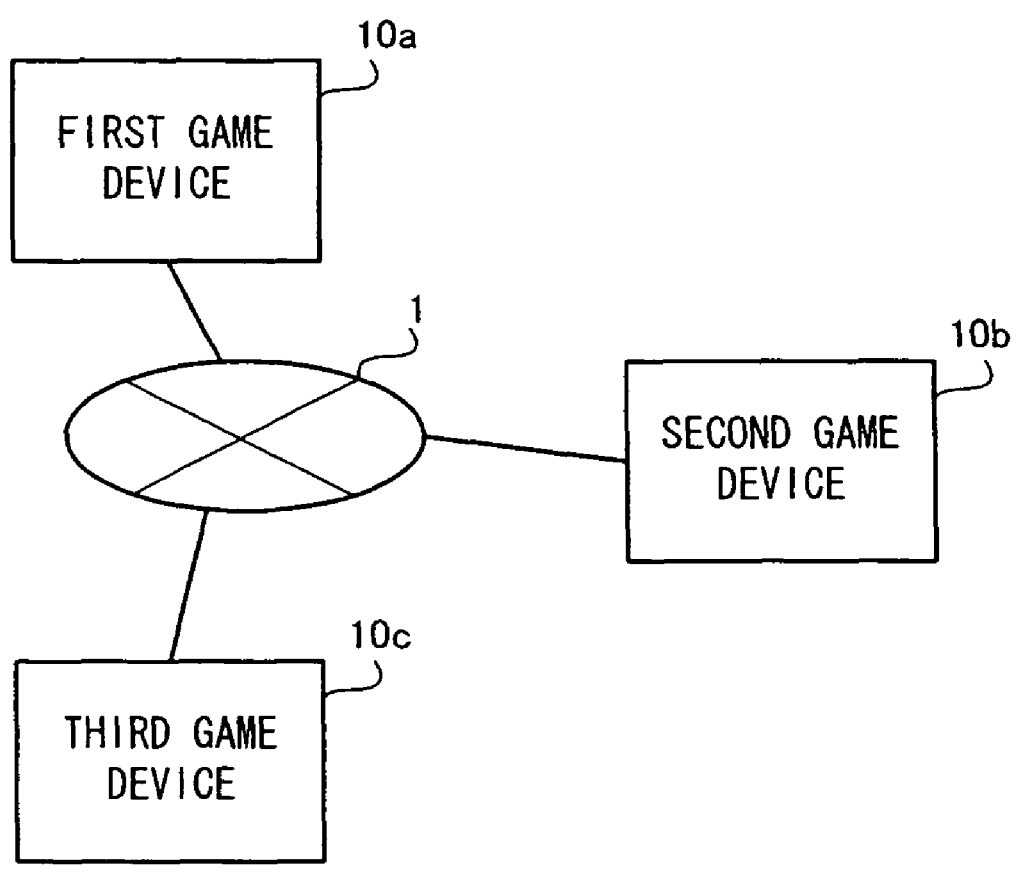
FIG. 1 is a block diagram illustrating a game system according to a present an example embodiment.

Hereinafter, a configuration of a game device included in a game system according to an embodiment will be described with reference to drawings. FIG. 1 is a block diagram illustrating a configuration of the game system according to the embodiment. As shown in FIG. 1, the game system is configured such that a plurality of hand-held game devices (hereinafter, simply referred to as "game devices") 10a to 10c are connected to each other through a network 1 such as internet. In the present embodiment, the game system is formed by the three game devices 10a to 10c, which are operated by three players, respectively, for example. Each of the game devices 10a to 10c can be connected to the network 1 by way of a wireless communication path. However, each of the game devices 10a to 10c may be connected to the network 1 by way of a wired communication path. In the following description, the three game devices 10a to 10c are referred to as a first game device 10a, a second game device 10b, and a third game device 10c, respectively. When there is no need to differentiate between the three game devices, each of the first to third game devices 10a to 10c may be simply referred to as a game device 10.

Figure 2:
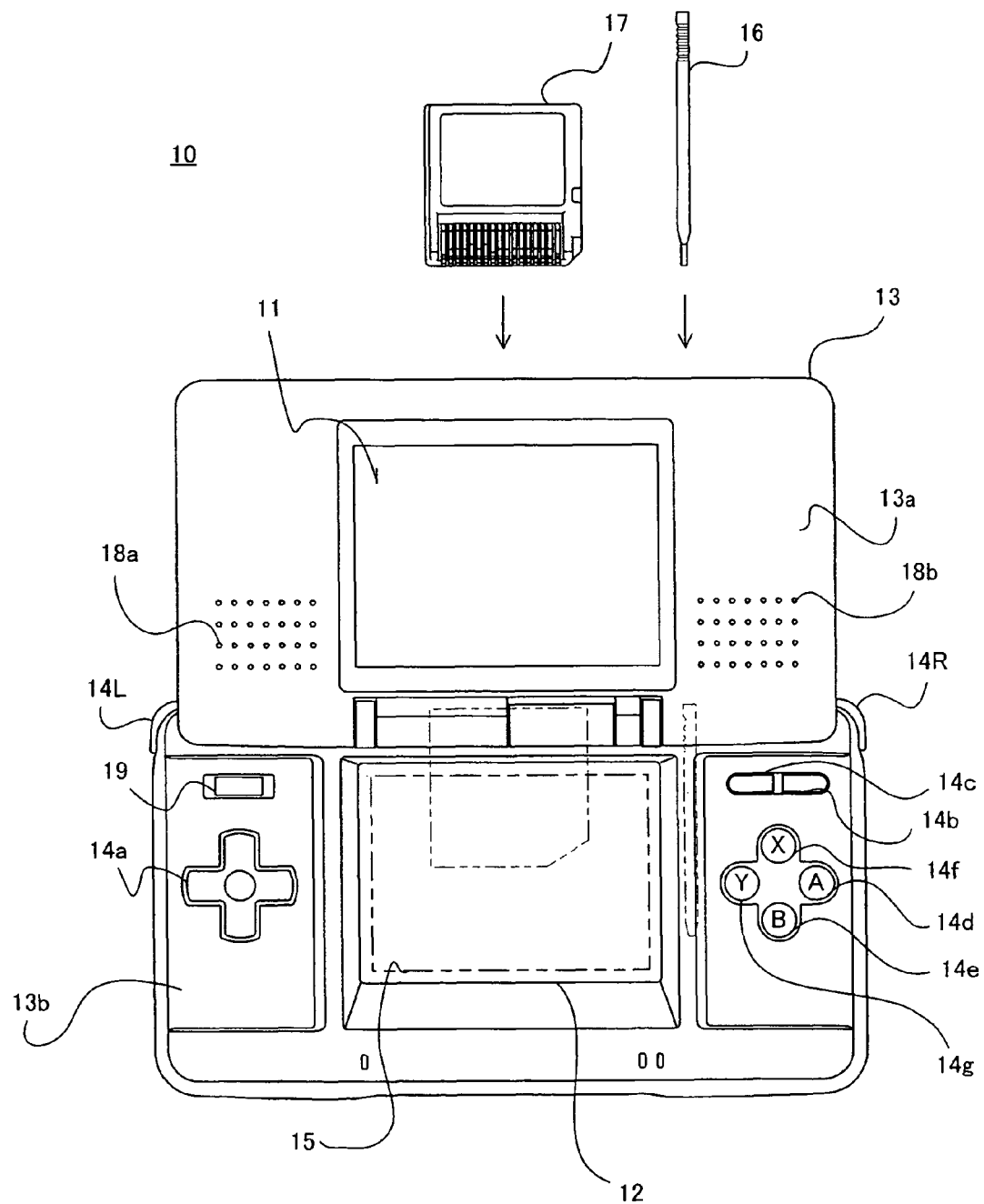
FIG. 2 is an external view of a game device included in the game system according to an example embodiment.

Firstly, a structure of the game device 10 will be described. FIG. 2 is an external view of the game device 10 included in the game system. In the present embodiment, the first to third game devices 10a to 10c have the same structure shown in FIG. 2.

The structure and a movement of the game device 10 will be described. FIG. 2 is the external view of the game device 10 included in the game system according to the present embodiment of the present invention. In FIG. 2, the game device 10 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that although a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 3) to an exterior. A description of the pair of loudspeakers will be described later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Although the following description is provided on an assumption that a player uses a stick 16 to operate the touch panel 15, of course the touch panel 15 may also be operated by a pen (stylus pen) or a finger-instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Figure 3:
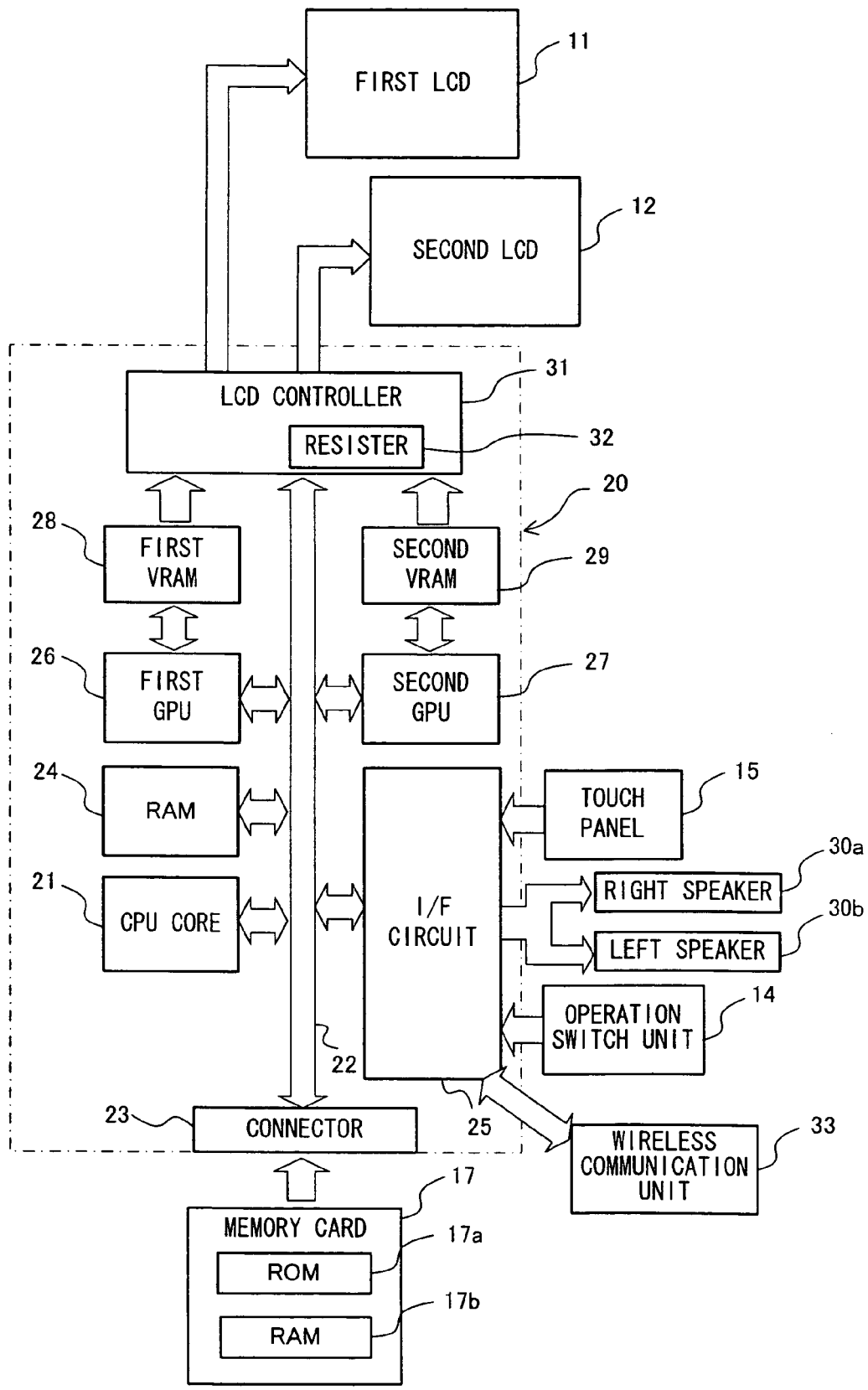
FIG. 3 is a diagram illustrating an internal configuration of the game device.

Next, an internal configuration of the game device 10 will be described with reference to FIG. 3. In FIG. 3, a CPU core 21 is mounted on an electronic circuit board 20 which is to be housed in the housing 13. Through a bus 22, the CPU core 21 is connected to a connector 23, an input/output interface circuit (shown as I/F circuit in the diagram) 25, a first GPU (Graphics Processing Unit) 26, a second GPU 27, a RAM 24, and a LCD controller 31. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, touch panel 15, a right loudspeaker 30a, a left loudspeaker 30b, a wireless communication unit 33, and an operation switch section 14, which is comprised of the cross switch 14a, the "A" button 14d, and others, as shown in FIG. 2. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU generates a first game image based on the image data which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the VRAM 28, and outputs to the second LCD 12 the second game image which has been written into the second VRAM 29. When the value of the resister 32 is 1, the first game image which has been written into the first VRAM 28 is outputted to the LCD 12, and the second game image which has been written into the second VRAM 29 is outputted to the first LCD 11.

The wireless communication unit 33 is connected to the I/F circuit 25. The wireless communication unit 33 has a function of allowing data used for a game process to be transmitted to and received from the wireless communication units 33 included in other game devices. As an example, the wireless communication unit 33 provides a function of performing wireless communication, which complies with a wireless LAN standard IEEE802.11. The wireless communication unit 33 outputs received data to the CPU core 21. Also, the wireless communication unit 33 transmits data instructed by the CPU core 21 to the other game devices. Note that a protocol such as TCP/IP (Transmission Control Protocol/Internet Protocol) or a predetermined browser is mounted in the wireless communication unit 33 or a storage unit of the game device 10, thereby allowing the game device 10 to be connected to the network such as internet through the wireless communication unit 33. Then, the game device 10 performs wireless communication with other game devices through the network, thereby further allowing the plurality of game devices to execute the same game. Furthermore, in the game device 10, data disclosed on the network such as a document or an image can be browsed on the first LCD 11 and the second LCD 12, and the game process can also be executed by using game data disclosed on the network.

The configuration of the mobile terminal 10 as described above is merely an example. The example embodiment presented herein is applicable to any computer system capable of communicating with other game devices through a network. Furthermore, the game program of the example embodiment presented herein can be supplied to a computer system not only by way of an external storage medium such as a memory card 17, but also by way of a wired or wireless communication path. The program can also be recorded beforehand in a nonvolatile storage unit in an interior of a computer system.

Figure 4:
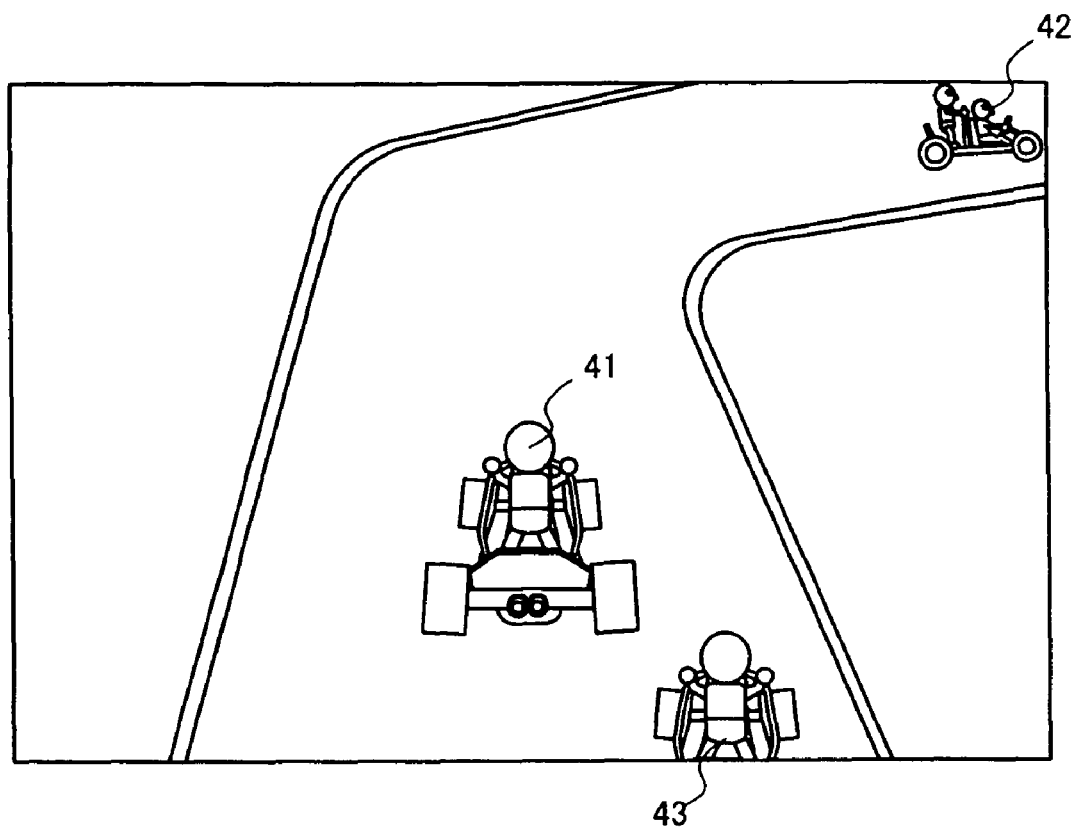
FIG. 4 is a view illustrating a game screen of a game executed in the present embodiment.

Hereinafter, a game to be executed by the game device 10 in the present example embodiment will be described. FIG. 4 is a view illustrating a game screen of the game according to the present embodiment. A cart (a racing car) 41 operated by a player of the game device 10 is displayed on the second LCD 12 thereof, together with moving objects, carts 42 and 43, operated by players of other game devices. This is a racing game, and the players of the racing game respectively operate the carts so as to compete against with each other to reach a goal as fast as possible.

In the racing game, shown in FIG. 4, in which game objects such as carts compete with each other to reach the goal as fast as possible, times at which the game devices 10a to 10c start the racing games need to coincide with each other as much as possible. Hereinafter, a process of allowing the times at which the game devices 10a to 10c start the racing games to coincide with each other as much as possible will be mainly described. Although the present embodiment describes the aforementioned process, the present embodiment is also applicable to a process of allowing times at which the game devices start events to be executed during the games to coincide with each other.

Figure 5:
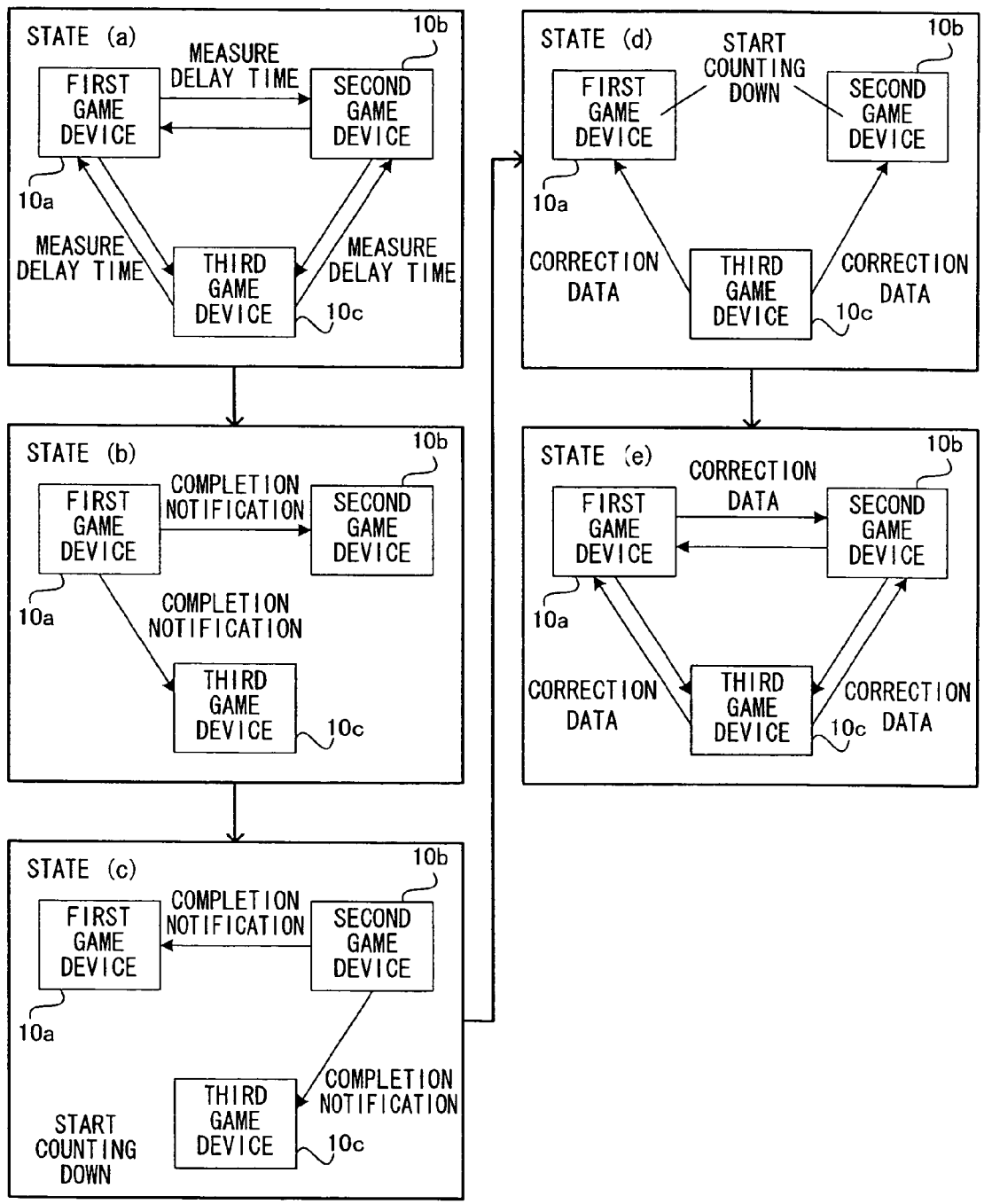
FIG. 5 is a view illustrating an outline of a process to be executed before starting a racing game.

Firstly, an outline of the process to be executed, before starting the racing game, by each of the game devices 10a to 10c will be described with reference to FIGS. 5 and 6. FIG. 5 shows the outline of the process to be executed before starting the racing game. Before starting the racing game, each of the game devices 10a to 10c executes a measurement process of measuring a delay time between the game device and each of the other two game devices, all of which communicate with each other through the network (state (a) shown in FIG. 5). Note that an illustration showing the network among the game devices is not shown in FIG. 5. The delay time indicates a time period required for transmitting and receiving data between the game device and each of the other two game devices, all of which communicate with each other through the network. Taking the first game device 10a as an example, the first game device 10a firstly transmits test data to the other game devices 10b and 10c. The test data may be any data if the data indicates a game device transmitting the test data. Upon receiving the test data from the first game device 10a, each of the other game devices 10b and 10c transmits replay data to the first game device 10a. Then, the first game device 10a measures a time period from when the test data is transmitted to each of the other devices 10b and 10c when the replay data is received from each of the other devices 10b and 10c. In this embodiment, the delay time is obtained by dividing the measured time period into halves.

As described above, the first game device 10a calculates a delay time between the first game device 10a and the second game device 10b, and a delay time between the first game device 10a and the third game device 10c. Each of the second and third game devices 10b and 10c executes a measurement process similar to that executed by the first game device 10a. That is, the second game device 10b calculates a delay time between the second game device 10b and the first game device 10a, and a delay time between the second game device 10*b* and the third game device 10*c*. Similarly, the third game device 10*c* calculates a delay time between the third game device 10*c* and the first game device 10*a*, and a delay time between the third game device 10*c* and the second game device 10*b*. Note that in the present embodiment, each of the game devices 10*a* to 10*c* measures a delay time based on a frame (1/60 second) Specifically, each of the game devices 10*a* to 10*c* has a timer for counting a time in 1/60 seconds mounted therein, and measures a time by means of the timer.

In the present embodiment, a delay time is obtained only once by measuring a time period from when a game device transmits test data to each of other game devices to when the game device receives reply data from each of the other game devices. In another embodiment, in order to improve an accuracy of measuring the delay time, the time period may be repeatedly measured for a plurality of times. For example, the game device 10 may repeatedly measure the time periods for ten times, and calculate an average of the time periods having been measured for ten times. Then, the calculated average time period may be divided into halves, thereby obtaining a delay time. Thus, a delay time can be more accurately measured.

Upon completing the measurement of the delay time, each of the game devices 10*a* to 10*c* transmits a notification (i.e., a completion notification) indicating that the measurement of the delay time has been completed to other game devices (states (b) and (c) shown in FIG. 5). Here, since the delay time between two of the game devices differs from that between other two of the game devices, times at which the game devices 10*a* to 10*c* complete the measurements of the delay times differ from each other. That is, times at which the game devices 10*a* to 10*c* transmit the completion notifications differ from each other. In FIG. 5, the first game device 10*a* initially transmits the completion notification to each of the other game devices 10*b* and 10*c* (state (b)), and then the second game device 10*b* transmits the completion notification to each of the other game devices 10*a* and 10*c*.

Next, each of the game devices 10*a* to 10*c* determines whether or not the game device starts counting down a time remaining before starting the racing game. Specifically, the determination can be made based on whether the game device has completed the measurement of the delay time between the game device and each of the other game devices and has received the completion notifications from all the other game devices. Referring to FIG. 5, in a state (c), the third game device 10*c* has completed a measurement of a delay time between the third game device 10*c* and the first game device 10*a* and a delay time between the third game device 10*c* and the second game device 10*b*, and the third game device 10*c* has also received the completion notification from each of the other game devices 10*a* and 10*b*. In this case, it is determined that the third game device 10*c* starts counting down a time remaining before starting the racing game (state (c)). As described above, in the present embodiment, the third game device 10*c* can recognize that each of the game devices 10*a* to 10*c* has already completed the measurement of the delay time without recognizing whether each of the other game devices 10*a* and 10*b* has received the completion notification transmitted from the third game device 10*c*.

After being determined to start counting down, the third game device 10*c* starts decrementing its counter value, which indicates the time remaining before starting the racing game. Note that the counter value is decremented frame by frame from a predetermined time value. Then, the third game device 10*c* transmits correction data to each of the other game devices 10*a* and 10*b* (state (d)). Note that the correction data is data for correcting the counter value. The details of the correction data will be described later. On the other hand, upon receiving the correction data from the third game device 10*c*, each of the game devices 10*a* and 10*b* starts counting down a time remaining before starting the racing game (state (d)). In the present embodiment, the third game device 10*c* is a game device which initially receives the completion notification from each of the other game devices 10*a* and 10*b*. However, depending on a delay time changed in accordance with a condition of the network, the first game device 10*a*, for example, may be the game device which initially receives the completion notification from each of the other game devices 10*b* and 10*c*. In other words, in the present embodiment, a game device initially transmitting the correction data is not a specific game device. Instead, the game device initially transmitting the correction data can be any of the game devices, thereby making it possible to accurately generate the correction data without being affected by the condition of the network.

In each of the game devices 10*a* and 10*b*, a counter value from which a timer starts counting down is not the predetermined time value, but a value obtained by correcting the predetermined time value based on the correction data. As described above, in the present embodiment, the game device which initially receives the completion notification from each of the other game devices transmits correction data to the other game devices. Then, upon receiving the correction data, each of the other game devices starts counting down the time remaining before starting the racing game. Thus, all the game devices 10*a* to 10*c* have started counting down the times remaining before remaining the racing-games.

The game device 10, which has started counting down the time remaining before starting the racing game, transmits the correction data to each of the other game devices at a predetermined time interval. Therefore, after all the game devices 10*a* to 10*c* have started counting down the times remaining before the racing games, the game devices 10*a* to 10*c* transmit the correction data to each other (state (e)). Note that in the present embodiment, the game device 10 transmits the correction data to each of the other game devices once per frame. Thus, in each frame, the first game device 10*a* transmits the correction data to the second game device 10*b* and the third game device 10*c*, the second game device 10*b* transits the correction data to the first game device 10*a* and the third game device 10*c*, and the third game device 10*c* transmits the correction data to the first game device 10*a* and the second game device 10*b*.

Then, each of the game devices 10*a* to 10*c* corrects, upon receiving the correction data transmitted from the other game devices, its counter value based on the correction data. Therefore, after each of the game devices 10*a* to 10*c* has started counting down the time remaining before starting the racing game, the counter value of each of the game devices 10*a* to 10*c* is repeatedly decremented frame by frame and corrected based on the correction data transmitted from the other game devices. An above process will be repeated until the counter value of the game device 10 reaches zero. When the counter value of the game device 10 reaches zero, the game device 10 starts the racing game.

As described above, in the present embodiment, the counter value of the game device 10 is repeatedly corrected based on the correction data transmitted from the other game devices, whereby the counter values of the game devices 10*a* to 10*c* are gradually being converged (i.e., the counter values thereof are coinciding with each other). Therefore, times at which the counter values of the game devices 10*a* to 10*c* reach zero coincide with each other, thereby making it possible to allow the times at which the game devices start the racing games to accurately coincide with each other. Hereinafter, a process of correcting the counter value of the game device 10 based on the correction data will be described.

Figure 6:
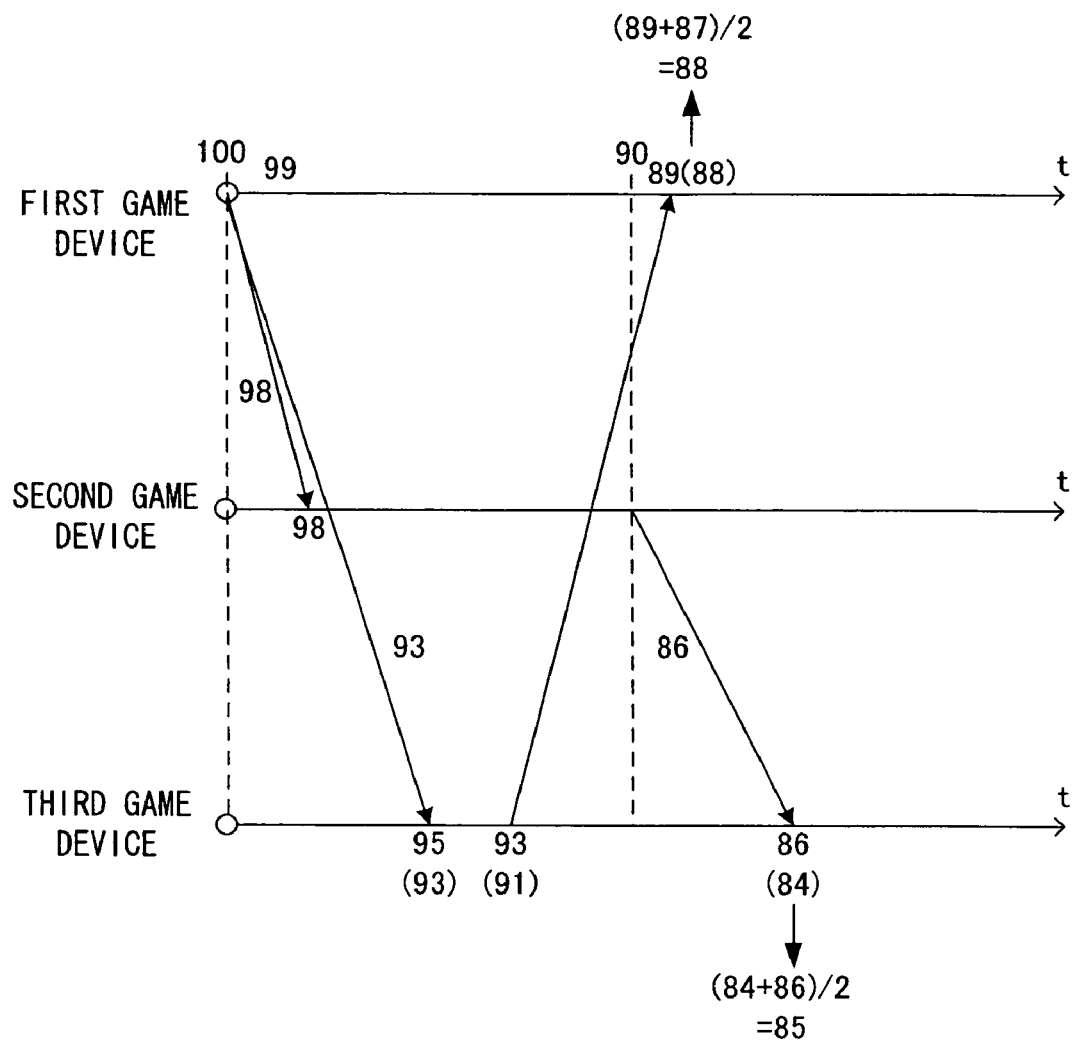
FIG. 6 is a view for describing a process of correcting a counter value of the game device.

FIG. 6 is a view for describing the process of correcting the counter value of the game device 10. Although the correction data is transmitted per frame in the present embodiment, FIG. 6 shows only a portion of the correction data transmitted and received among the game devices 10a to 10c, and a remaining portion of the correction data is not shown therein, in order to facilitate the understanding of the following description. Furthermore, in FIG. 6, an initial counter value is 100 (frames), and a game device initially starts counting down its counter value is the first game device 10a. In addition, in FIG. 6, when a time remaining before starting the racing game (hereinafter, referred to as a "remaining time value") is 100 frames, the first game device 10a transmits the correction data to the second game device 10b and the third game device 10c; when the remaining time value is 90 frames, the second game device 10b transmits the correction data to the third game device 10c; and when the remaining time value is 93 frames, the third game device 10c transmits the correction data to the first game device 10a.

Note that the correction data indicates a remaining time value obtained when a game device receives the correction data. Thus, the game device determines information included in the correction data based on its counter value, and a delay time between the game device and another game device to which the correction data is transmitted, both of which communicate with each other. For example, it is assumed that a delay time between the first game device 10a and the second game device 10b is two frames, and the first game device 10a transmits the correction data to the second game device 10b when the remaining time value is 100 frames. In this case, the first game device 10a estimates a remaining time value obtained when the second game device 10b receives the correction data transmitted from the first game device 10a. Specifically, the delay time (two frames) is subtracted from the remaining time value (100 frames) so as to obtain the correction data. In this case, the first game device 10a transmits the correction data indicating "98 frames" to the second game device 10b. Upon receiving the correction data, the second game device 10b starts counting down the remaining time value. That is, the second game device 10b starts counting down from 98 frames. Furthermore, it is assumed that a delay time between the first game device 10a and the third game device 10c is seven frames. In this case, the correction data indicating "93 frames" is transmitted from the first game device 10a to the third game device 10c when the remaining time value is 100 frames. Then, upon receiving the correction data, the third game device 10c starts counting down from 93 frames.

As described above, a game device transmitting correction data estimates a remaining time value obtained when another game device, to which the correction data is transmitted, receives the correction data, and information regarding the estimated remaining time value is transmitted as the correction data. However, in practice, a delay time between two game devices communicating with each other is not always measured accurately. Furthermore, because the delay time varies as time elapses, the delay time having been initially measured may differ from that obtained when the correction data is transmitted. Therefore, a remaining time value obtained when the said another game device receives the correction data may not coincide with the estimated remaining time value indicated by the correction data. For example, in FIG. 6, a time at which the third game device 10c receives correction data from the first game device 10a is five frames after a time at which the first game device 10a transmits the correction data to the third device 10c. Specifically, the third device 10c receives the correction data indicating "93 frames" when the remaining time value is 95 frames (see FIG. 6). At this time, although the third game device 10c should have recognized that the remaining time value is 95 frames, the third game device 10c starts counting down from 93 frames. As a result, when the third game device 10c starts counting down from 93 frames, the counter value of the third game device 10c is two frames ahead of the remaining time value. As described above, in the present embodiment, a delay time between any of the two game devices communicating with each other is measured, and each of the game devices counts down a remaining time value while correcting the remaining time value by using correction data generated based on the delay time. However, if the correction data is transmitted only from one game device to the others only once, the times at which the game devices start racing games may not accurately coincide with each other.

Thus, in the present embodiment, the game devices transmit the correction data to each other, thereby making it possible to minimize differences of the counter values between the game devices. As a result, times at which the counter values of the game devices reach zero can coincide with each other. Hereinafter, the reason therefore will be described with reference to FIG. 6.

In FIG. 6, when the remaining time value is 93 frames, the third game device 10c transmits correction data to the first game device 10a. At this time, the third game device 10c should have recognized that the remaining time value is 93 frames. However, the third game device 10c mistakenly recognizes that the remaining time value is 91 frames. This is because, as described above, when the third game device 10c started courting down the remaining time value, the counter value of the third game device 10c was two frames ahead of the remaining time value. Now, it is assumed that a delay time between the third game device 10c and the first game device 10a is four frames. The correction data transmitting from the third game device 10c to the first game device 10a indicates that the remaining time value is 91−4=87 frames.

It is assumed that a time at which the first game device 10a receives, in accordance with the delay time having been measured, the correction data is four frames after a time at which the correction data is transmitted from the third game device 10c. That is, the first game device 10a receives the correction data when the remaining time value is 89 frames. However, the correction data indicates that the remaining time value is 87 frames, and the first game device 10a corrects the remaining time value by using the correction data. Specifically, the first game device 10a calculates an average value between the remaining time value indicated by the correction data and the remaining time value indicated by the counter value of the first game device 10a, thereby obtaining a new counter value. In an example of FIG. 6, the remaining time value indicated by the correction data transmitted from the third game device 10c is "87 frames", and the remaining time value indicated by the counter value of the first game device 10a is "89 frames". Therefore, a corrected counter value of the first game device 10a will indicate "88 frames". On the other hand, when the first game device 10a receives the correction data, the counter value of the third game device 10c indicates "87 frames" as the remaining time value. Therefore, although a difference between the counter value of the first game device 10a and that of the third game device 10c is two frames before a correction is performed in accordance with the correction data, the difference therebetween is one frame after the correction is performed in accordance with the correction data.

That is, the difference between the counter values of the two game devices becomes smaller.

As described above, in the present embodiment, the game devices transmit the correction data to each other, thereby converging differences between the counter values of the game devices (i.e., gradually reducing the differences of the counter values between the game devices). Thus, the times at which the counter values of the game devices reach zero (i.e., the times at which the game devices start the racing games) can accurately coincide with each other.

Furthermore, in the present embodiment, a game device receives a plurality of pieces of correction data from a plurality of other game devices. Therefore, even if a time at which a piece of correction data is received is either ahead of or behind a remaining time value having been estimated, another piece of correction data can reduce or cancel a difference between the time at which the piece of correction data is received and the estimated remaining time value. Hereinafter, the reason therefore will be described with reference to FIG. 6.

In FIG. 6, when the remaining time value is 90 frames, the second game device 10b transmits correction data to the third game device 10c. Here, it is assumed that a measured delay time between the second game device 10b and the third game device 10c is four frames, and the third game device 10c receives, in accordance with the measured delay time, the correction data four frames after the correction data is transmitted from the second game device 10b. When the third game device 10c receives the correction data from the second game device 10b, the counter value of the third game device 10c indicates "84 frames" (see FIG. 6). That is, the third game device 10c mistakenly recognizes that the remaining time value is 84 frames. As described above, this is because when the third game device 10c started counting down the remaining time value, the counter value of the third game device 10c was two frames ahead of the remaining time value. However, the correction data transmitted from the second game device 10b indicates that the remaining time value is 86 frames. Therefore, the third game device 10c corrects the remaining time value by using the correction data. In the example of FIG. 6, the remaining time value indicated by the correction data transmitted from the second game device 10b is "86 frames", and the remaining time value indicated by the counter value of the third game device 10c is "84 frames", thereby correcting the counter value so as to indicate "85 frames" as a remaining time value. That is, before a correction is performed, a difference between the remaining time value indicated by the counter value of the third game device 10c and that indicated by the correction data transmitted from the second game device 10b is two frames. However, after the correction is performed, the difference therebetween is one frame. As a result, the difference therebetween is reduced.

As described above, in the present embodiment, the game device receives the plurality of pieces of correction data from the plurality of other game devices. Therefore, even if a counter value of the game device is corrected in accordance with one piece of correction data transmitted from one of the other game devices, thereby generating a difference between a corrected counter value and the remaining time value having been determined, other pieces of correction data transmitted from the other game devices can reduce or cancel the difference. Furthermore, in the present embodiment, a game device receives a plurality of pieces of correction data from another game device for a plurality of times. Therefore, even if a counter value of the game device is corrected in accordance with one piece of correction data, thereby generating a difference between a corrected counter value and the a remaining time value, other pieces of correction data received after the aforementioned piece of correction data can reduce or cancel the difference. Thus, the times at which the counter values of the game devices reach zero (i.e., the times at which the game devices start the racing games) can accurately coincide with each other.

Figure 7:
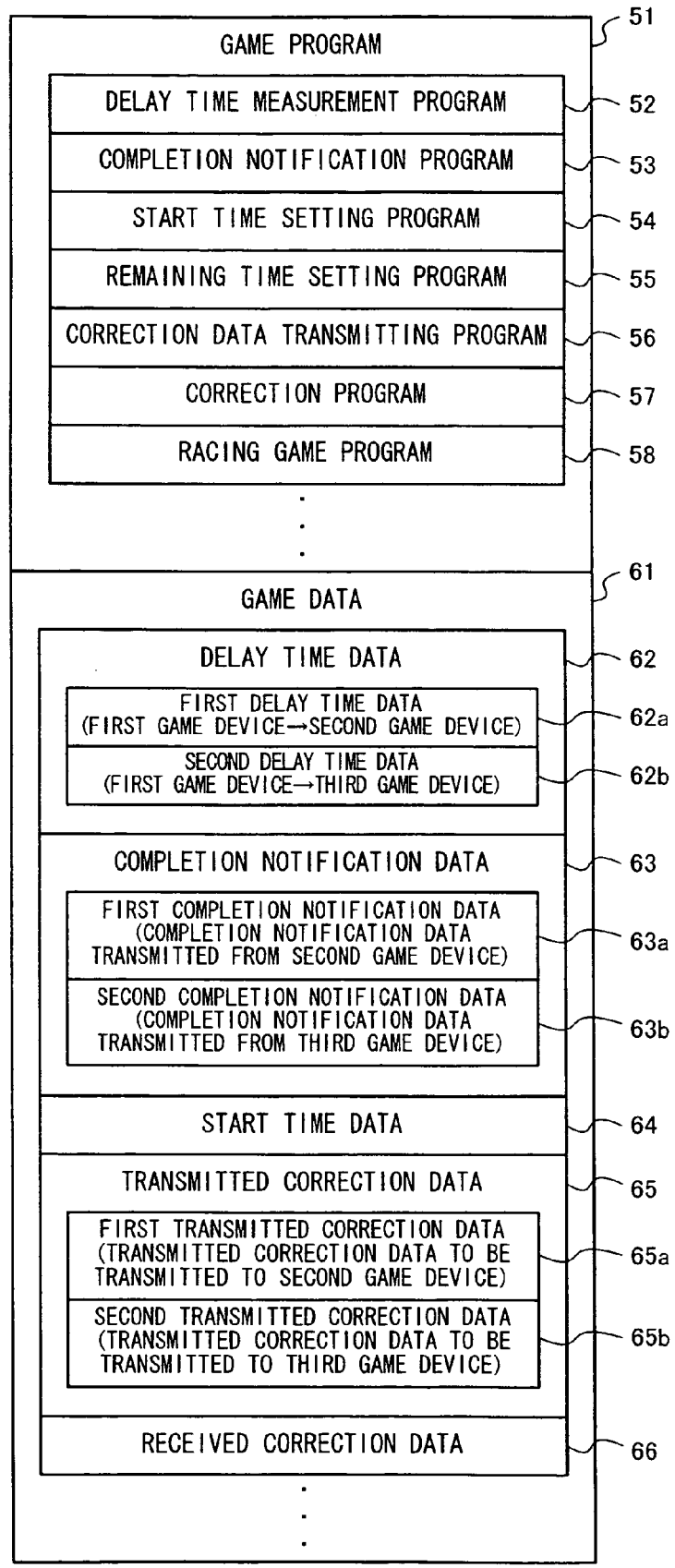
FIG. 7 shows main data stored in a RAM 24 of the game device 10.

Next, a game process to be executed by the game device 10 when executing the game program according to the present embodiment will be described in detail. Firstly, main data used in the game process will be described with reference to FIG. 7. FIG. 7 shows the main data stored in the RAM 24 of the game device 10. As shown in FIG. 7, a game program 51 and game data 61 are stored in the RAM 24.

The game program 51 includes a delay time measurement program 52, a completion notification program 53, a start time setting program 54, a remaining time counting program 55, a correction data transmitting program 56, a correction program 57, a racing game program 58, and the like. Note that the game program 51 includes, in addition to the above programs, a program for executing a process of receiving data transmitted from other game devices.

The delay time measurement program 52 measures a delay time between the game device and each of the other game devices communicating with each other. The completion notification program 53 notifies each of the other game devices that a measurement of the delay time is completed. The start time setting program 54 sets a counter value (i.e., start time data to be described below) indicating a time remaining before the game device starts a racing game. The remaining time counting program 55 updates the counter value so as to indicate a new counter value from which a predetermined frames is subtracted. The correction data transmitting program 56 calculates a remaining time value, which is a time remaining before each of the other game devices starts executing a predetermined event, and transmits correction data indicating the calculated remaining time value to each of the other game devices. The correction program 57 corrects, upon receiving the correction data transmitted from the other game devices, the remaining time value indicated by the counter value of the game device based on the correction data. The racing game program 58 proceeds with the racing game in accordance with an operation executed by a player.

On the other hand, the game data 61 includes delay time data 62, completion notification data 63, start time data 64, transmitted correction data 65, and received correction data 66. Note that the RAM 24 stores, in addition to the data shown in FIG. 7, data required for the racing game, such as data regarding a cart operated by the player (i.e., positional data, speed data and image data of the cart). Note that in FIG. 7, data stored in the RAM 24 of the first game device 10a is described. However, data similar to that stored in the RAM 24 of the first game device 10a is also stored in the RAM 24 of each of the other game devices 10b and 10c.

The delay time data 62 is data showing a delay time between the game device and each of the other game devices communicating with each other. The delay time data 62 includes a first delay time 62a indicating a delay time between the first game device 10a and the second game device 10b, and a second delay time 62b indicating a delay time between the first game device 10a and the third game device 10c. In the delay time data 62 stored in the second game device 10b, the first delay time data 62a indicates a delay time between the second game device 10b and the first game device 10a, and the second delay time data 62b indicates a delay time between the second game device 10b and the third game device 10c. Similarly, in the delay time data 62 stored in the third game device 10c, the first delay time data 62a indicates a delay time between the third game device 10c and the first game device 10a, and the second delay time data 62b indicates a delay time between the third game device 10c and the second game device 10b. Note that the delay time measured by each of the game devices is stored in the RAM 24 as the delay time data 62. Because each of the game devices 10a to 10c measures a delay time in an independent manner, the delay time measured by the game device differs from that measured by each of the other game devices. For example, the first delay time data 62a stored in the first game device 10a and the first delay time data 62a stored in the second game device 10b both indicate the delay time between the first game device 10a and the second game device 10b. However, the delay time data 62a stored in the first game device 10a may differ from the delay time data 62a stored in the second game device 10b.

The completion notification data 63 is data, transmitted from the other game devices, which notifies the game device that each of the other game devices has completed the measurement of the delay time. Upon receiving completion notification data transmitted from the other game devices, the game device 10 stores the completion notification data in the RAM 24. The completion notification data 63 stored in the first game device 10a includes a first completion notification data 63a indicating a completion notification transmitted from the second game device 10b, and a second completion notification data 63b indicating a completion notification transmitted from the third game device 10c.

The start time data 64 is data showing a time at which the game device starts the racing game. In the present embodiment, a counter value indicating a time remaining from a current time to a time at which the game device starts the racing game is stored as the start time data 64. Note that the start time data 64 may be any data indicating the time at which the game device starts the racing game. For example, the start time data 64 may include the time at which the game device starts the racing game as well as the current time.

The transmitted correction data 65 is correction data to be transmitted from the game device to each of the other game devices. As described above, the transmitted correction data 65 shows an estimated time value, remaining before starting the racing game, which is obtained when each of the other game devices receives the correction data. The transmitted correction data 65 stored in the first game device 10a includes a first transmitted correction data 65a indicating correction data to be transmitted to the second game device 10b, and a second transmitted correction data 65a indicating correction data to be transmitted to the third game device 10c. Similarly, the transmitted correction data 65 stored in each of the second game device 10b and the third game device 10c includes, as the first transmitted correction data 65a and the second transmitted correction data 65b, two pieces of correction data to be transmitted to the other two game devices, respectively. In the present embodiment, the transmitted correction data 65 is updated at each frame. Each time the transmitted correction data 65 is updated, the updated transmitted correction data 65 is transmitted to other game devices.

The received correction data 66 is correction data which has transmitted to the game device from the other game devices. The received correction data 66 shows an estimated time value, remaining before starting the game, which is obtained when the game device receives the correction data. The received correction data 66 is updated each time the game device receives the correction data from the other game devices.

Figure 8:
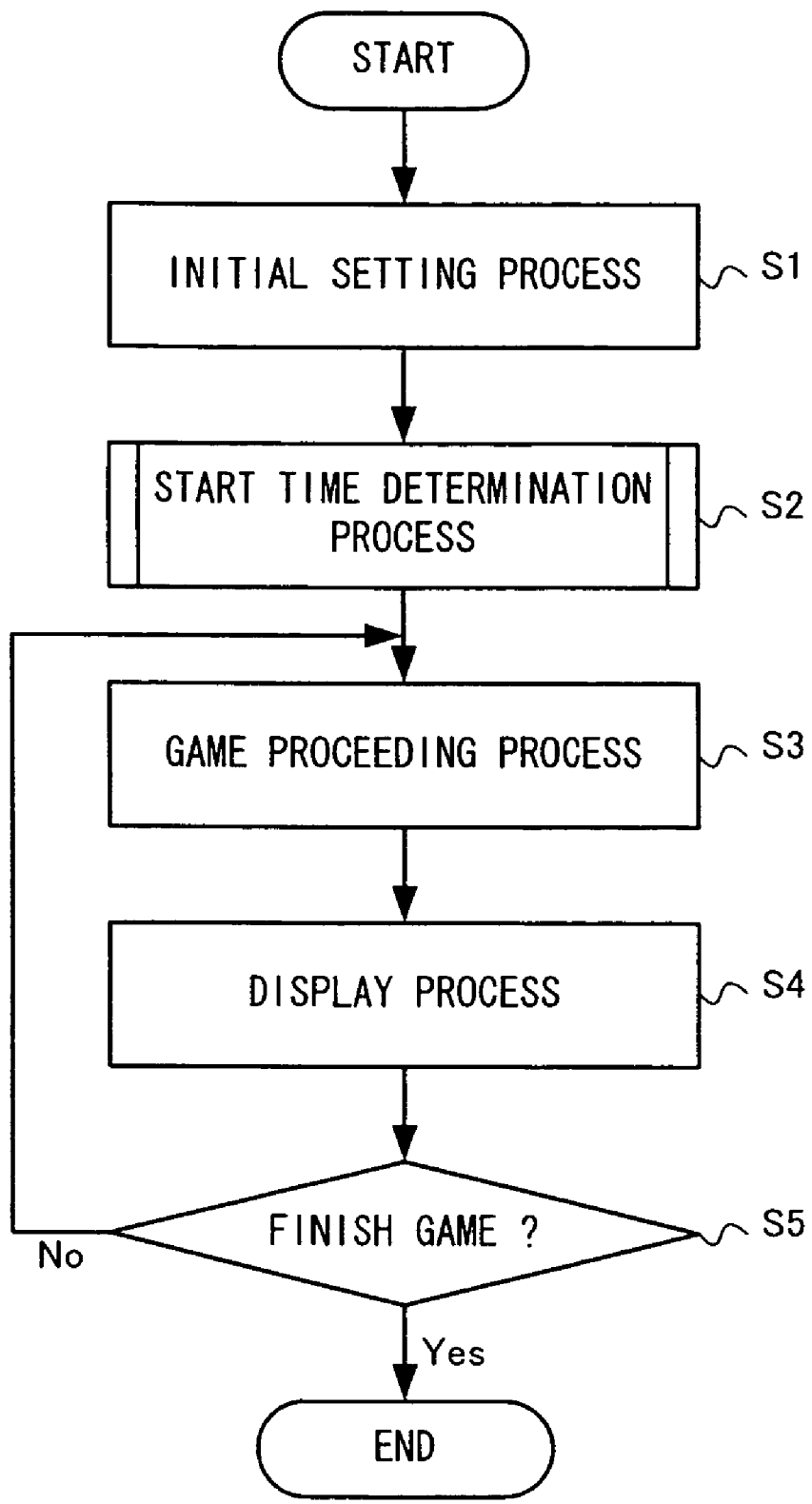
FIG. 8 is a main flowchart illustrating a process flow of the game to be executed by the game device 10.

Next, the game process to be executed by the game device 10 when executing the game program will be described in detail with reference to FIGS. 8 and 9. FIG. 8 is a main flowchart illustrating a process flow of the game to be executed by the game device 10. When a power source of the game device 10 is turned on, the CPU core 21 of the game device 10 executes a start-up program stored in a boot ROM (not shown), thereby initializing the respective units such as the RAM 24. Thereafter, the game program stored in the memory card 17 is loaded to the RAM 24, and the game program having been loaded to the RAM 24 is executed by the CPU core 21. FIG. 8 is a flowchart illustrating the process flow of the game to be executed after the aforementioned process is completed. In FIGS. 8 and 9, among the process flow of the game, a process of adjusting the times at which the game devices starts the racing games will be described in detail. However, any detailed descriptions of other processes which do not pertain to the present invention will be omitted.

Firstly, in step S1 of FIG. 8, an initial setting process is executed. In the initial setting process, the CPU core 21 sets an ID uniquely assigned to each of the game devices which can communicate with each other through a network in order to participate in the racing game. Furthermore, in the initial setting process, a game space of the racing game is established, and a game object, such as a cart, operated by the player and a game object operated by the game device 10 are respectively disposed in initial positions.

In step S2, a start time determination process is executed. The start time determination process is a process of determining a time at which each of the game devices starts the racing game. Each of the game devices starts the racing game when the start time determination process is finished. Hereinafter, the start time determination process will be described in detail with reference to FIG. 9.

FIG. 9 is a flowchart illustrating a detailed process flow to be executed in step S2 shown in FIG. 8. In the start time determination process, the delay time measurement program 52 is firstly executed in step S11, thereby measuring a delay time between the game device and each of the other game devices communicating with each other. As described above, a game device measures a delay time between the game device and each of other game devices (see the state (a) shown in FIG. 5). Specifically, the first game device 10a measures a delay time between the first game device 10a and the second game device 10b, and a delay time between the first game device 10a and the third game device 10c. The delay time measured in step S11 is stored in the RAM 24 as the delay time data 62. For example, in the first game device 10a, data indicating the delay time between the first game device 10a and the second game device 10b is stored in the RAM 24 as the first delay time data 62a, data indicating the delay time between the first game device 10a and the third game device 10c is stored in the RAM 24 as the second delay time data 62b. Note that delay times between any of the two game devices differ from each other. Thus, times at which the game devices complete the measurements of the delay times differ from each other. After step S11, step S12 is executed.

In step S12, the completion notification program 53 is executed, thereby transmitting the completion notification to each of the other game devices. Specifically, the CPU core 21 generates completion notification data, and transmits the completion notification data to each of the other game devices. After step S12, step S13 is executed.

In step S13, the CPU core 21 determines whether or not the game device has received the completion notifications from all the other game devices. Although not shown in FIG. 9, the CPU core 21 checks whether or not the game device has received data from the other game devices at a predetermined time interval (e.g., per frame) while the game process is being executed. Upon receiving the completion notification data, the game device stores the received completion notification data in the RAM 24. Therefore, the determination in step S13 can be made based on whether or not the RAM 24 of the game device stores the completion notification data transmitted from all the other game devices. In a case where it is determined that the game device has received the completion notification from at least one of the other game devices, step S14 is executed. On the other hand, in a case where it is determined that the game device has received the completion notifications from all the other game devices, step S15 is executed.

In step S14, the CPU core 21 determines whether or not the game device has received the correction data from all the other game devices. The determination in step S14 can be made based on whether or not the RAM 24 of the game device stores the received correction data 66. This is because the game device can receive the correction data from the other game devices only after the game device starts counting down the time remaining before starting the racing game. In a case where it is determined that the game device has received the correction data from the other game devices, step S16 is executed. On the other hand, in a case where it is determined that the game device has not yet received the correction data from the other game devices, step S13 is executed again. Thereafter, step S13 or step S14 is repeatedly executed until it is determined "Yes" in either step S13 or step S14.

In step S15, the start time setting program 54 is executed, thereby setting a predetermined remaining time value as the start time data 64. For example, when it is assumed that the predetermined remaining time value is 100 frames, data indicating "100 frames" is stored in the RAM 24 as the start time data 64.

Alternatively, in step S16, the start time setting program 54 is executed, thereby setting the start time data 64 in accordance with the correction data having been received. For example, when a remaining time value indicated by the received correction data 66 stored in the RAM 24 is 95 frames, data indicating "95 frames" is stored in the RAM 24 as the start time data 64.

After executing steps S13 to S16, each of the game devices starts counting down the time remaining before starting the racing game. In a game device which has received the completion notifications from all other game devices, it is determined "Yes" in step S13, thereby causing step S15 to be executed. As a result, the game device starts counting down from the predetermined remaining time value. On the other hand, in a game device which has received the correction data from other game devices before receiving the completion notifications from all the other game devices, it is determined "Yes" in step S14, thereby causing step S16 to be executed. As a result, the game device starts counting down from a remaining time value indicated by the correction data. After step S15 or step S16, a loop of steps S17 to S22 is executed, thereby causing each of the game devices to count down a remaining time value. Note that the loop of steps S17 to S22 is executed once per frame.

In step S17, the remaining time counting program 55 is executed, thereby causing each of the game devices to start counting down the remaining time value. The CPU core 21 updates the remaining time value, indicated by the start time data 64 stored in the RAM 24, by subtracting one frame from the remaining time value.

In steps S18 and S19, the correction data transmitting program 56 is executed, thereby generating the correction data so as to be transmitted to the other game devices. Specifically, in step S18, the correction data to be transmitted to each of the other game devices is generated. A remaining time value indicated by the correction data is a value obtained by subtracting, from a current remaining time value having been set in the game device, a delay time between the game device and each of the other game devices to which the correction data is transmitted. More specifically, the CPU core 21 reads the delay time data 62 and the start time data 64 both stored in the RAM 24, thereby generating the correction data by subtracting the delay time indicated by the delay time data 62 from the remaining time value indicated by the start time data 64. The CPU core 21 performs a subtraction process so as to generate the correction data to be transmitted to each of the other game devices. For example, the first game device 10a generates the correction data to be transmitted to the second game device 10b, and the correction data to be transmitted to the third game device 10c. The generated two pieces of correction data are stored in the RAM 24 as the first transmitted correction data 65a and the second transmitted correction data 65b, respectively.

In step S19, the correction data generated in step S18 is transmitted to each of the other game devices. The CPU core 21 transmits the transmitted correction data 65 stored in the RAM 24 to each of the other game devices. Specifically, the first game device 10a transmits the first transmitted correction data 65 to the second game device 10b, and the second transmitted correction data 65b to the third game device 10c.

In step S20, the CPU core 21 determines whether or not the game device has received new correction data from the other game devices in a current frame. The determination in step S20 can be made based on whether or not the received correction data 66 stored in the RAM 24 is updated in the current frame. Then, when it is determined that the game device has received new correction data from the other game devices, step S21 is executed. On the other hand, when it is determined that the game device has not received the new correction data from the other game devices, step S21 is skipped, and then step S22 is executed.

In step S21, the correction program 57 is executed, thereby correcting the start time data 64 based on the received correction data. Specifically, the CPU core 21 calculates an average value between the remaining time value indicated by the received correction data and the remaining time value indicated by the start time data 64, so as to update the start time data 64 to the average value. After step S21, step S22 is executed.

The present embodiment illustrates an example where a remaining time value is updated by obtaining an average value between two remaining time values. However, the remaining time value may be calculated by other methods. Any method can be used if the remaining time value is updated so as to indicate any value between the two remaining time values. For example, the CPU core 21 may calculate a correction amount (i.e., an amount to which a current remaining time value is added or from which the current remaining time value is subtracted) based on a correction amount having been calculated in accordance with already received correction data and a correction amount calculated in accordance with currently received correction data. Specifically, when the game device receives the n-th (n is an integer of 1 or more) correction data, the correction amount may be calculated in accordance with the following expression.

$$\mathrm{Add}(n)=(\mathrm{Add}(n-1)+\mathrm{Diff}(n))/2$$

In the above expression, Add(n) (n is the integer of 1 or more) is a function indicating a correction amount obtained when the game device receives the n-th correction data. Also, Diff (n) is a difference between a remaining time value indicated by the correction data received at the n-th time and a current remaining time value (a remaining time value indicated by the start time data 64). Specifically, in the above expression, the correction amount is calculated by obtaining an average value between the correction amount (add(n−1)) having been calculated in accordance with the already received correction data (i.e., the correction data received until the (n−1)th time) and the correction amount calculated in accordance with the currently received correction data (i.e., the correction data received at the n-th time). Note that when a method for calculating an average value between a remaining time value indicated by the correction data and a remaining time value of the game device is used, the following problem may occur. When the both remaining time values become smaller, and the remaining time value indicated by the received correction data significantly differs from that of the game device, the remaining time value of the game device is substantially corrected in accordance with the remaining time value indicated by the received correction data, whereby a time at which the remaining time value of the game device reaches zero may significantly differ from that at which a remaining time value of each of the other game devices reaches zero. However, when a method for calculating a current correction amount based on the correction amount having been calculated in accordance with the already received correction data is used in the above situation, the current correction amount affected by the correction data will be smaller. Thus, times at which the remaining time values of the game devices reach zero can easily coincide with each other.

In step S22, it is determined whether or not the game device is to start the racing game. Specifically, the CPU core 21 determines whether or not the remaining time value indicated by the start time data 64 reaches zero. When it is determined that the game device is to start the racing game (i.e., when the remaining time value reaches zero), the CPU core 21 finishes the start time determination process, and starts the racing game. On the other hand, when it is determined that the game device is not to start the racing game (i.e., when the remaining time value has not yet reached zero), step S17 is executed again. Thereafter, the loop of steps S17 to S22 is repeated until it is determined in step S22 that the game device is to start the racing game.

Referring back to FIG. 8, when the start time determination process in step S2 is finished, the racing game program 58 is executed in steps S3 to S5, thereby starting the racing game. Specifically, in step S3, a process of proceeding with the racing game is executed. The process is to control a motion of the game object such as the cart in accordance with an operation executed by the player. In step S4, a game image is generated in accordance with a processed result obtained in step S3 so as to be displayed on the second LCD 12. In step S5, whether or not the game device is to finish the racing game is determined. The CPU core 21 determines, for example, whether or not carts operated by players of all game devices have reached a goal, or a predetermined time has passed since the racing game has started, in order to determine whether or not the game device is to finish the racing game. Then, when it is determined that the game device is to finish the racing game, the CPU core 21 finishes the game process shown in FIG. 8. On the other hand, when it is determined that the game device is not to finish the racing game, steps S3 to S5 are repeatedly executed until it is determined that the game device is to finish the racing game, thereby proceeding with the racing game.

As described above, in the present embodiment, after all the game devices start counting down times remaining before starting the racing games, the game devices transmit the correction data to each other. Then, a counter value of the game device is corrected based on the correction data transmitted from the other game devices, thereby allowing counter values of the game devices to gradually coincide with each other. As a result, the times at which the game devices start the racing games can accurately coincide with each other.

Furthermore, in the present embodiment, the counter values indicating the remaining time values are adjusted to each other between the game devices, and no specific game device corresponds to a "master device". Therefore, even when the specific game device corresponding to the "master device" is caused not to communicate with other game devices, the racing game can always be started. More specifically, even when a problem was occurred after all the game devices have started counting down, thereby causing any of the game devices not to communicate with other game devices, the other game devices would not be affected by the problem. In other words, the other game devices can continue the games, allowing the times at which the game devices start the racing games to coincide with each other.

Still furthermore, in the present embodiment, while the game devices count down the times remaining before starting the racing games, the correction data is repeatedly transmitted between the game devices. Therefore, even when a communication environment over a network (i.e., communication speed or noise) ceaselessly changes, the times at which the game devices start the racing games can accurately coincide with each other.

Although the present embodiment illustrates an example where the game device 10 transmits the correction data once per frame, the correction data may be transmitted at a different time interval. The game device may transmit the correction data once per several frames, or the game device may determine a time interval for transmitting the correction data on a random basis within a predetermined time interval. Furthermore, in the present embodiment, a game device transmits the correction data to all other game devices within one frame. In another embodiment, a game device may transmit the correction data to each of other game devices within each frame. In this case, the game device sequentially transmits the correction data such that each of the other game devices equally receives the correction data.

Still furthermore, in the aforementioned embodiment, the remaining time value, which is the time remaining before starting the racing game, is indicated based on a frame. Note that the remaining time value indicated by the start time data 64 does not need to be an integer indicating a number of frames remaining before starting the racing game. The remaining time value indicated by the start time data 64 may be a decimal. In this case, in step S22, the remaining time value may be determined by rounding off a decimal portion to the nearest integer, or by rounding up or down a fractional portion of the remaining time value.

In the aforementioned embodiment, a game device may simultaneously receive two or more pieces of correction data within one frame. In this case, the game device may correct the remaining time value based on one of the received correction data, or the game device may correct the remaining time value based on all of the received correction data. In a case where the remaining time value is corrected based on one of the correction data, the game device selects either initially received correction data or most recently received correction data, thereby correcting the remaining time value based on the selected correction data. In a case where the remaining time value is corrected based on all of the correction data, the game device may calculate an average value between the remaining time value indicated by the counter value of the game device and a remaining time value indicated by each of the correction data.

Furthermore, the aforementioned embodiment illustrates an example where the times at which the game devices start the racing games are coincided with each other as much as possible. However, the example embodiment is applicable to a game system in which times, at which the game devices start certain events executed during the racing game, are coincided with each other as much as possible. For example, the example embodiment is applicable to various situations, such as times at which the game devices start mini games executed during the game are coincided with each other as much as possible, or times at which specific items appear on screens of the game devices are coincided with each other as mush as possible.

A feature of the example embodiment presented herein is to allow times between game devices comprising a game system to more accurately coincide with each other, for example. The example embodiment is applicable to a game system, a game device, a game program, and the like.

While the example embodiment has been described in detail, the foregoing description is in all aspects illustrative and not restrictive. It is understood that numerous other modifications and variations can be devised without departing from the scope of the example embodiment.

What is claimed is:

1. A non-transitory computer-readable physical storage medium having tangibly recorded thereon a communication game program to be executed by a computer of a game device included in a communication game system comprised of the game device and at least one other game device being connected to each other through a decentralized network, the communication game program instructing the computer to perform:
   measurement for measuring a delay time between the game device and each of the at least one other game device, all of which communicate with each other;
   storage for storing start time data indicating a time at which the game device is to start executing a predetermined event in a memory of the game device;
   transmission for calculating a time at which each of the at least one other game device of the decentralized network is to start executing the predetermined event based on the delay time, and transmitting data indicating the time to each of the at least one other game device;
   correction for correcting, when data indicating a time at which the game device is to start executing the predetermined event is transmitted from each of the at least one other game device in the decentralized network, the time indicated by the start time data based on the transmitted data; and
   event execution for executing the predetermined event at the time indicated by the start time data.

2. The non-transitory computer-readable physical storage medium according to claim 1, wherein
   the start time data indicates a remaining time from a current time to the time at which the game device is to start executing the predetermined event;
   the storage is executed after each of the at least one other game device included in the communication game system finishes measuring the delay time;
   and the communication game program instructs the computer to further perform a subtraction of repeatedly executing a process of updating the start time data at a predetermined time interval such that the updated start time data indicates a time obtained by subtracting a predetermined time from the start time data.

3. The non-transitory computer-readable physical storage medium according to claim 2, wherein
   the communication game program instructs the computer to further perform completion notification for notifying each of the at least one other game device that the game device finishes measuring the delay time, and
   the subtraction is executed if the game device has received a notification indicating that each of the at least one other game device finishes measuring the delay time or if data indicating the time at which the game device is to start executing the predetermined event is initially transmitted from the at least one other game device.

4. The non-transitory computer-readable physical storage medium according to claim 3, wherein
   in the storage, when the game device has received the notification indicating that each of the at least one other game device finishes measuring the delay time, data indicating a predetermined time is stored in the memory as the start time data, and
   when the data indicating that the time at which the game device is to start executing the predetermined event is initially transmitted from the at least one other game device, the data is stored in the memory as the start time data.

5. The non-transitory computer-readable physical storage medium according to claim 1, wherein
   the transmission is executed at a predetermined time after each of the at least one other game device included in the communication game system finishes measuring the delay time.

6. The non-transitory computer-readable physical storage medium according to claim 5, wherein
   the transmission is repeatedly executed at a predetermined time interval after each of the at least one other game device included in the communication game-system finishes measuring the delay time.

7. The non-transitory computer-readable physical storage medium according to claim 1, wherein
   in the transmission, the time at which each of the at least one other game device is to start executing the predetermined event is calculated based on the delay time between the game device and each of the at least one other game device and the start time data.

8. The non-transitory computer-readable physical storage medium according to claim 1, wherein
   in the correction, a corrected time is calculated such that the corrected time indicates a time point between the time indicated by the data transmitted from each of the at least one other game device and the time indicated by the start time data.

9. A communication game system comprised of a game device and at least one other game device being connected to each other through a decentralized network, the game device comprising:
   measurement programmed logic circuitry for measuring a delay time between the game device and each of the at least one other game device, all of which communicate with each other;
   storage control programmed logic circuitry for storing start time data indicating a time at which the game device is to start executing a predetermined event in a memory of the game device;
   transmission programmed logic circuitry for calculating a time at which each of the at least one other game device in the decentralized network is to start executing the predetermined event based on the delay time, and transmitting data indicating the time to each of the at least one other game device;

correction programmed logic circuitry for correcting, when data indicating a time at which the game device is to start executing the predetermined event is transmitted from each of the at least one other game device in the decentralized network, the time indicated by the start time data based on the transmitted data; and event execution programmed logic circuitry for executing the predetermined event at the time indicated by the start time data.

* * * * *